Figure 1A:
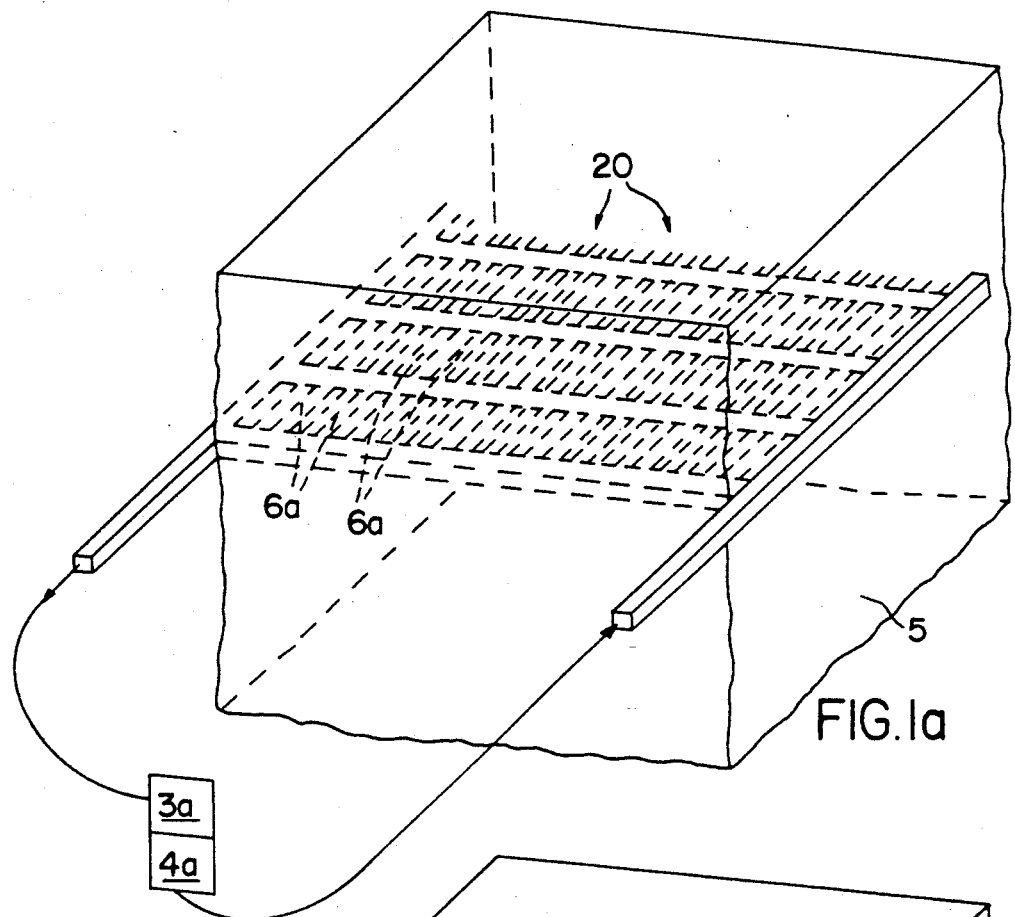
Figure 1B:
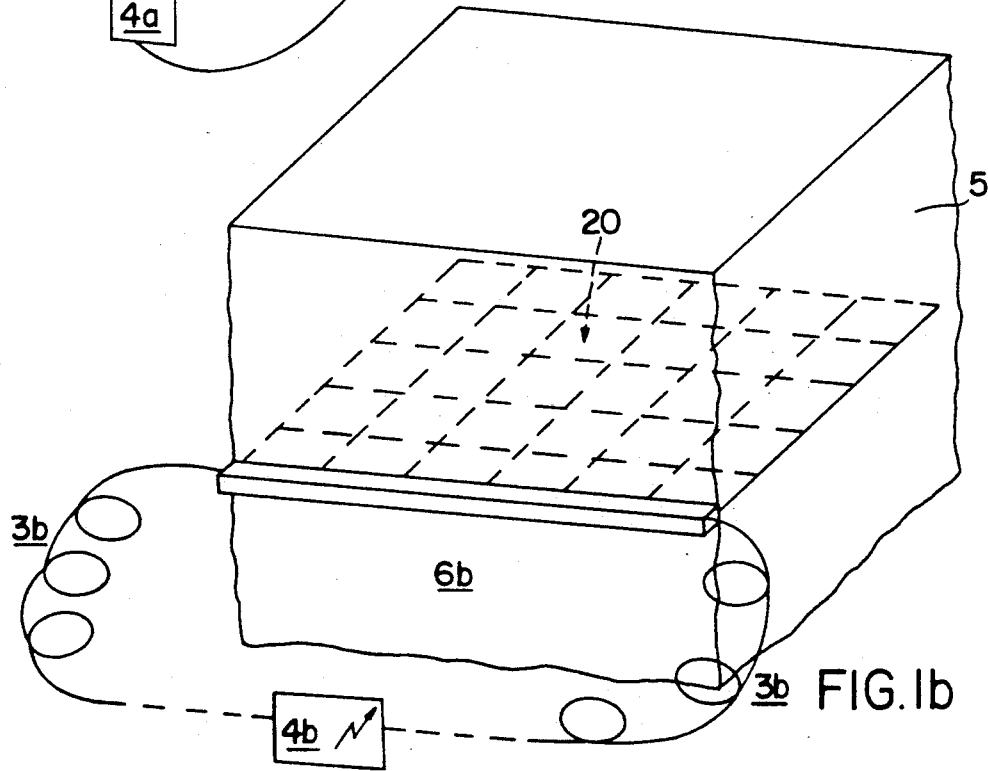
Figure 2A:
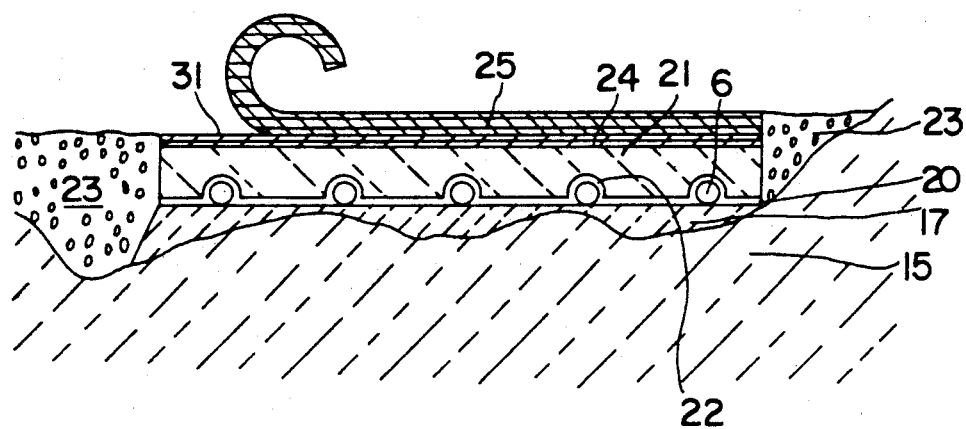
Figure 2B:
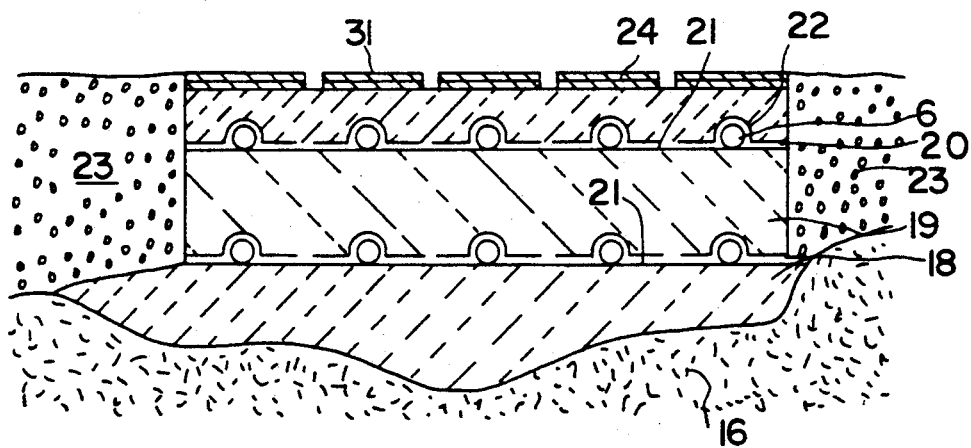
Figure 3A:
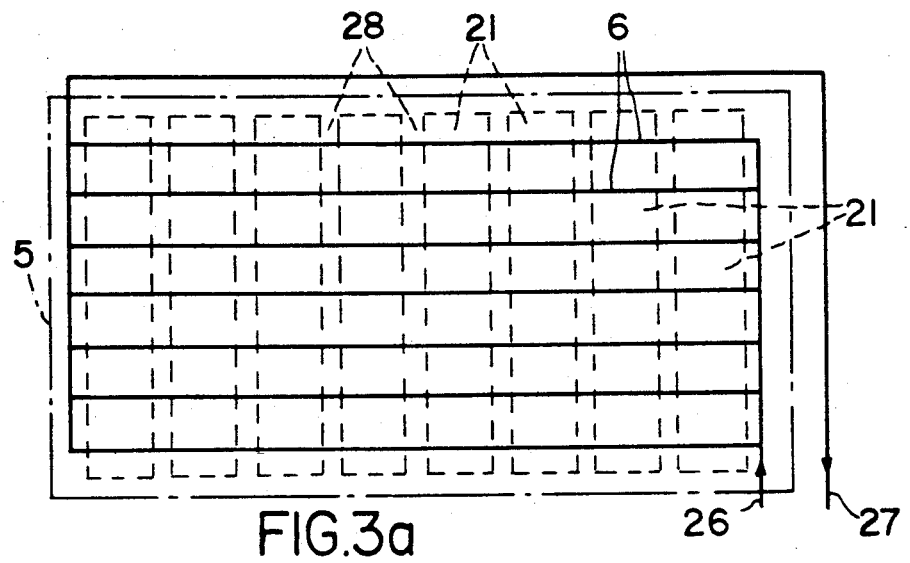
Figure 3B:
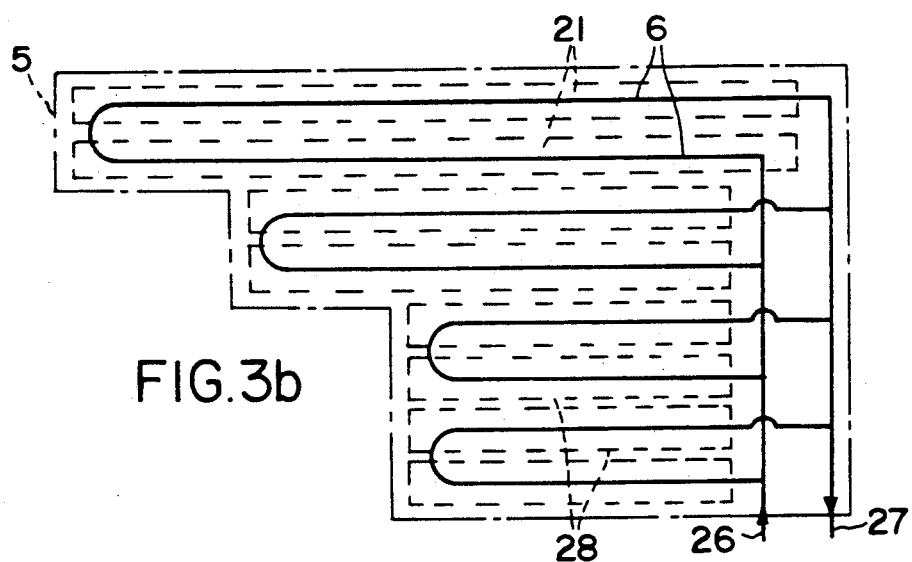
Figure 3C:
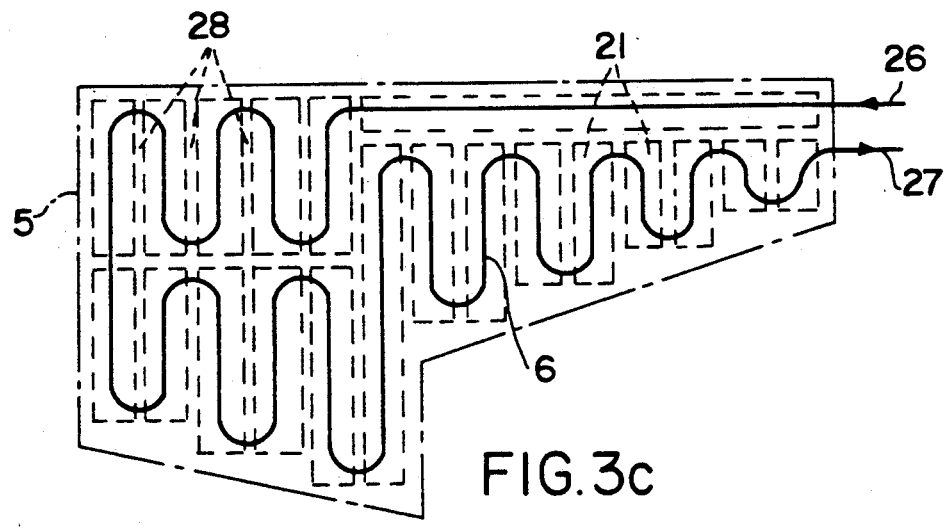
Figure 4A:
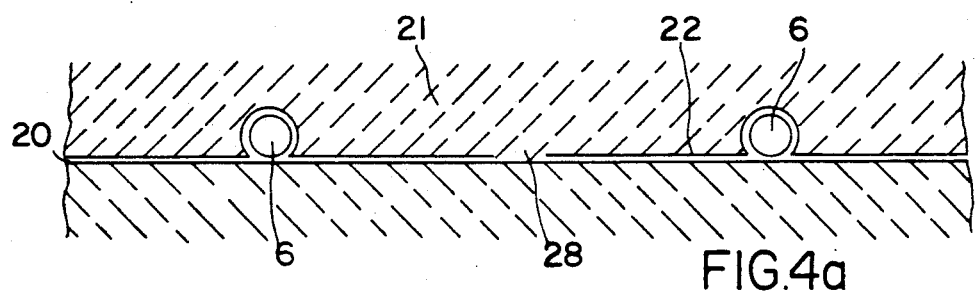
Figure 4B:
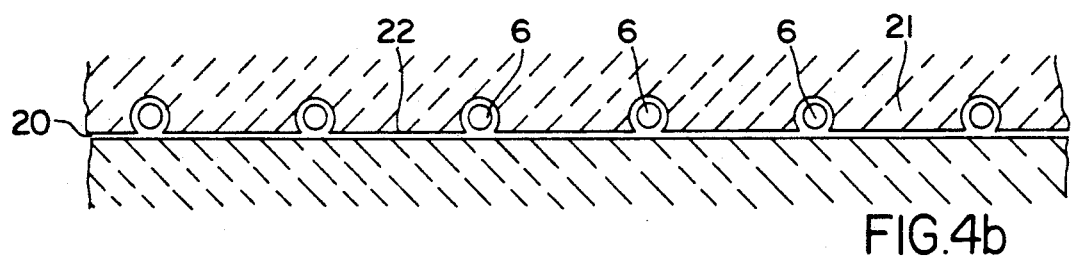
Figure 4C:
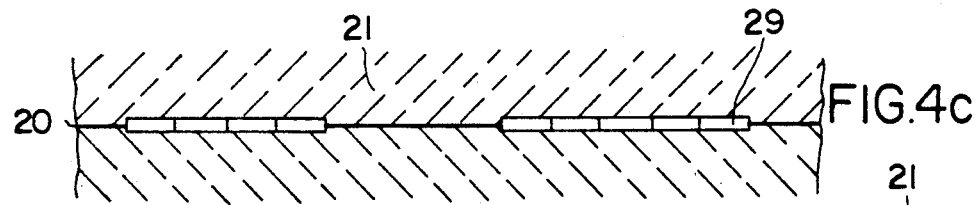
Figure 4D:
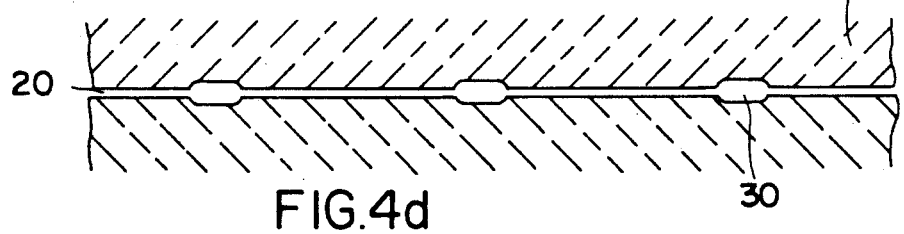
Figure 5:
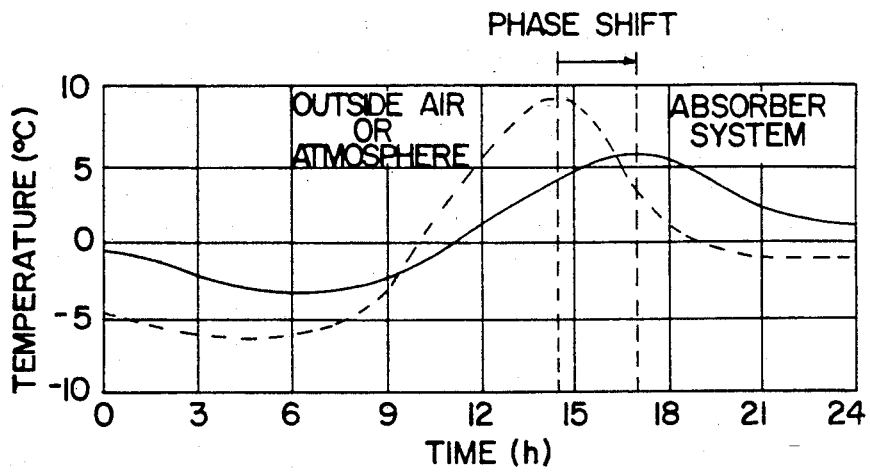
Figure 6:
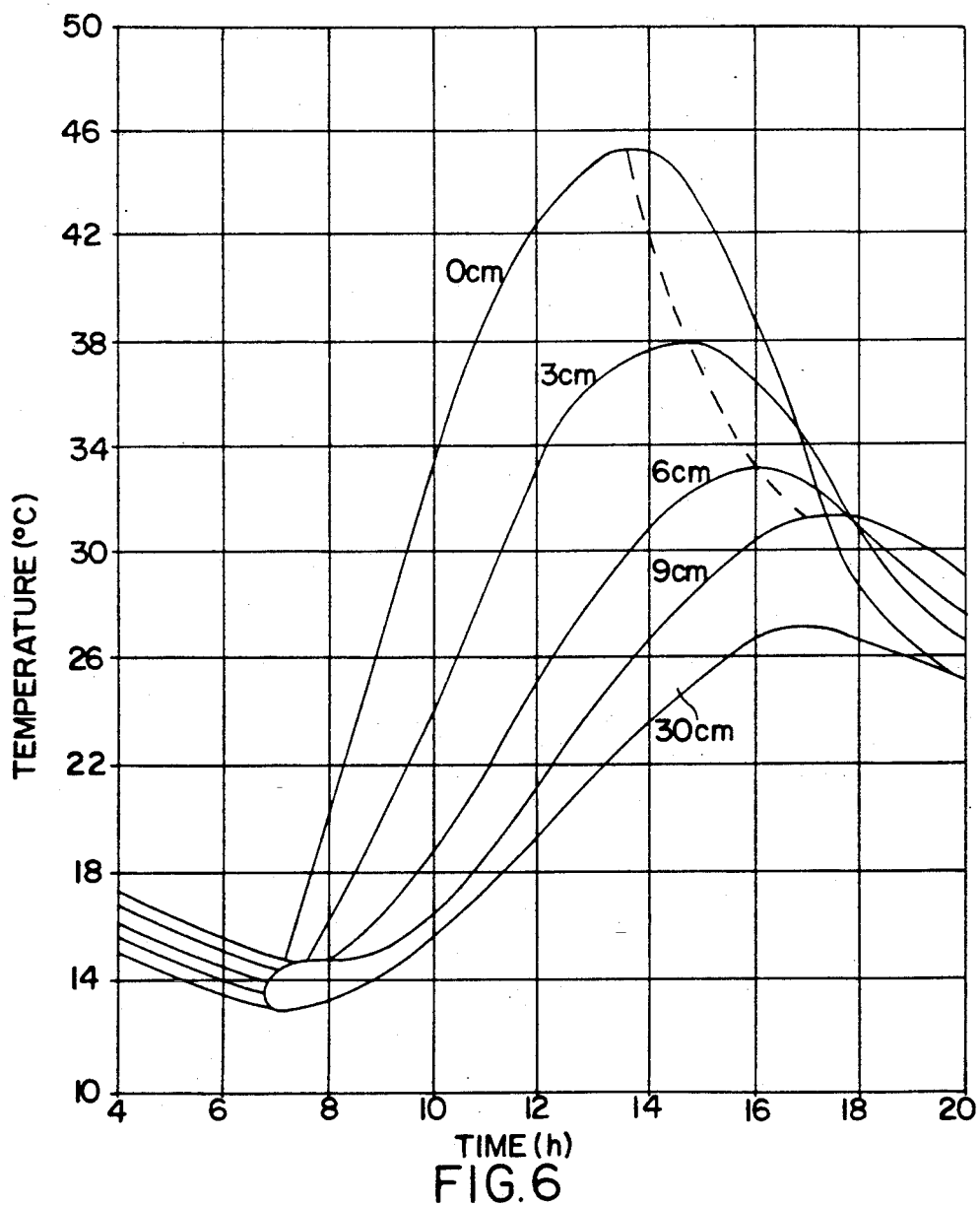

United States Patent [19]

Messner

[11] Patent Number: 5,069,199
[45] Date of Patent: Dec. 3, 1991

[54] DEVICE SUITABLE FOR PRODUCING A THERMAL FLOW INSIDE A THERMAL INTEGRAL BLOCK

[76] Inventor: Casper O. H. Messner, Gut Roseberg, Feldbach, Switzerland

[21] Appl. No.: 302,237
[22] PCT Filed: Mar. 17, 1988
[86] PCT No.: PCT/CH88/00060
§ 371 Date: Jan. 10, 1989
§ 102(e) Date: Jan. 10, 1989
[87] PCT Pub. No.: WO88/07160
PCT Pub. Date: Sep. 22, 1988
[51] Int. Cl.$^5$ .............................. F24H 7/02
[52] U.S. Cl. .................... 126/400; 165/10; 165/45; 165/47
[58] Field of Search .............. 126/400; 165/10, 47, 165/56, 45

[56] References Cited

U.S. PATENT DOCUMENTS

| | | | |
|---|---|---|---|
| 2,066,656 | 1/1937 | Stromberg | 165/56 X |
| 2,621,027 | 12/1952 | Tatsch | 165/56 |
| 2,681,796 | 6/1954 | Rapp | 165/56 |
| 2,722,732 | 11/1955 | Sandberg | 165/56 X |
| 3,301,251 | 1/1967 | Jackson | 126/400 |
| 3,802,492 | 4/1974 | Hilgemann | 165/54 |
| 4,011,989 | 3/1977 | Diggs | 237/59 |
| 4,088,266 | 5/1978 | Keyes | 126/400 X |
| 4,139,321 | 2/1979 | Werner | 405/154 |
| 4,391,267 | 7/1983 | Arrhenius | 126/400 |
| 4,398,593 | 8/1983 | Casinelli | 165/104.11 |
| 4,508,162 | 4/1985 | Radtke | 165/56 |
| 4,646,814 | 3/1987 | Fennesz | 165/56 |

FOREIGN PATENT DOCUMENTS 59-41723  3/1984  Japan .................. 165/56

OTHER PUBLICATIONS

Australian Application No. AU-B-35883/78 to Dancer.
Australian Application No. AU-B1-26872-77 to Blacklund.

Primary Examiner—Allen J. Flanigan
Attorney, Agent, or Firm—Grimes & Battersby

[57] ABSTRACT

The invention relates to a device capable of creating heat flow within an integral thermal block of the type used for heat storage. The device has a thermal conductivity coefficient higher than that of the block and a surface that is connected to the integral block in such a way as to permit thermal flow. This shapes the isotherms inside the block to extend virtually parallel to one another.

26 Claims, 8 Drawing Sheets

DEVICE SUITABLE FOR PRODUCING A THERMAL FLOW INSIDE A THERMAL INTEGRAL BLOCK

The present invention relates to a device capable of creating heat flow within an integral thermal block of finite or quasi finite dimensions. The invention relates further to a system incorporating a device suitable for employing or storing heat inside a thermal integral block, as well as to a system capable of exploiting atmospheric or terrestrial heat. Such a system moreover permits by regulating the surface temperature e.g. of a block constituting a floor, the heating or cooling of the atmosphere enveloping such a thermal intergral block.

Heat is fed or removed by means of a system that by-passes the heat flow produced inside the integral block, such a system operating essentially at an angle to such block, therefore the proposed device is also hereunder referred to as a heat shunt.

The problem of heat supply or removal with respect to the exploitation of heat issuing from atmospheric (solar and global radiation, latent heat, heat contained in the air, and in meteoric and waste water) and terrestrial (earth, ground and springs) sources—entails the contemporary requirement of the exploitation of energy that is renewable on a daily or yearly basis.

The development of concepts and processes relating to such energy exploitation which have to some extent, been protected by intellectual property laws, has increased greatly in recent years. Purely terrestrial underground heat extraction methods are technically feasible only if quasi-punctiform heat removal methods are employed at the lowest points of drilled holes. If terrestrial and atmospheric heat is to be captured, the latter can be captured only very near the earth's surface. Such methods necessarily interfere with local plant growth.

Numerous arrangements involving the dual purpose or multi-purpose use of parking areas or certain kinds of sports installations have been directed at exploiting terrestrial or atmospheric energy, whereby at the same time storage systems are utilized to an essentially large extent in storing daytime heat and releasing it at night. In order to load the storage system or to maintain the surface in an ice-free condition, heat is fed in general to systems that, designed for specific uses, are protected by numerous patents.

Also known is an arrangement suitable for heating and cooling a layer of bituminous material exposed to solar radiation, in particular the top layer of street pavement that features a plurality of heat exchange units disposed along the length of the material layer to be heated and/or cooled. Such units incorporate two fluid-flow systems, of which the first serves to transmit heat to and from the material layer to be heated and/or cooled, and the second serves to transfer heat to and from a heat storer.

The heat storer in this case constitutes the sub-structure of the street and may consist in whole or in part of the earth removed during construction of the street.

A heat transfer medium circulates through the fluid flow system in order to transport heat from the material layer into the heat storer and vice-versa, depending on whether the material layer is to be cooled in the summer or heated in the winter. Both fluid-flow systems are disposed in vertical planes (DE-OS 34 07 927).

Another concept involving the use of a massive absorber as a new kind of heating system for prefabricated concrete components, has been dealt with exhaustively in SIA Bulletin "Industrial Construction", 4/82. In this arrangement, energy is drawn from the environment in the form of heat by absorbers that are actually large-surface heat exchangers.

Such heat energy is brought by means of a heat pump from a lower temperature level to a higher temperature level, so that the resulting heat energy can be used for heating purposes.

In this paper, the temperatures at the surface and in various layers of a 30 cm steel-reinforced concrete wall exposed to the sun are plotted against time and the phase shift of the temperature curve in the fluid-filled absorber system is described. The output of the heat pump, relative to the outer air temperature, given the heating temperature as a system parameter, is illustrated.

In addition to a large area piping system, CH-PS-661-340 proposes that further metallic contact plates be laid on top of a heat storage layer, such contact layers being used today in surface heating technology.

Common to all such systems is a heat removal procedure that is effected through heat exchange pipes whose surface is, under certain circumstances, enlarged by the employment of conventional ribs or plates that serve to improve system performance. The quasi linear tubular system, i.e. one providing only limited surface coverage produces, inside a thermal integral block or storage system, virtually cylindrical isotherms whose linear transport capacity expressed as $W/m^2K$, does not correspond to an actual planar removal pattern having virtually parallel isotherms.

The plates proposed in CH-PS-601 340 moreover contain short-circuit elements since they redirect heat from the end of the tubing back to the tube entrance.

It is thus the objective of the present invention to create a device capable of producing inside a thermal integral block an incoming or outgoing flow of heat, whereby the isotherms produced inside the thermal integral block run virtually parallel to one another, and the heat conduits run preferably at an angle to the heat flow produced in the thermal integral block.

This objective is satisfied according to the invention by means of a device, preferably in accordance with one or more claims, particularly claim 1.

The precondition for the transport of heat inside an integral block in a direction that is not the original direction is the presence of a layer acting as a heat shunt whose heat transfer capacity is 20 to 1000 times that of the thermal integral block and that the relationship between the smallest cross section of such layer, to the heat-transporting cross-section of the integral block should permit a heat flow that is proportional to the relationship of the specific heat transfer capacity $\lambda$ $W/mK$ of the integral block to the highly conductive heat shunt layer.

The transport or removal of heat to or from the device takes place either through a fluid heat transport medium, which secondarily, is directed to a conversion or consumption point, or by means of electric transport governed by the Joule effect in the case of heat being supplied, or in the case of heat being removed, governed by the Pelletier-effect.

The high-capacity heat transporting layer that transports heat in an integral block of low conductivity, may consist of copper, aluminum, silver or gold and its alloys and may be formed through the installation of semi-finished products such as sheet or piping, through the casting of the aforementioned metals into a composite structure, or by creating a sintered body in which the highly conductive layer is produced through sintering in situ.

The thermal integral block of finite or quasi finite dimensions having in its heat transporting portion heat transport capacities between 20 and 200 W/m², can be used to capture and store atmospheric and terrestrial heat;
to control the temperature of the surrounding area in thermal process control in nonmetallic thick-walled containers used in chemical and biochemical process technology.
in precise heating or cooling of the insides of mechanical components while precluding local temperature excesses e.g. maintenance of cooling or heating in electronic equipment.

The bidimensional effect of heat flow through the heat conduction layer permits the transfer of maximum specific heat outputs with certain differences in K. In this respect, the invention differs essentially from the direct installation of a heat exchanger charged with a heat transport fluid, whereby the heat flow under ideal conditions occurs more or less linearly through heat exchange pipes, and very often, in the case of spherical containers, only in quasi-punctiform fashion.

The present invention ensures the maximum heat flow expressed in W/m² through a thermal integral block of any finite or quasi finite length through the optimal design of a heat flow occurring during either the feeding or the removal of heat.

Throughout the course of development of this system there has arisen applications for capturing atmospheric and earth-bound energy, such as those of large systems used in chemical/biological process technologies and in machine construction. In such applications, the transport of heat using a transport fluid, whereby in special circumstances even steam heat can be directly used, has gained significance.

In the case of industrial applications involving precision products or electronics, heat can be transported electrically by the Joule effect or removed by means of a Pelletier-element.

Should the heat exchange pipe registers installed to facilitate the forward and return flow of the heat transport medium and connected to the heat conducting surface acting as a shunt be arranged in parallel fashion, the heat transport medium is permitted to cool or heat during forward movement through the thermal integral block up to the point of return, in such a way that there ensues, over the entire width and in the corresponding direction, a uniform temperature gradient between the forward and return flows. The highly conductive feed or removal layer should under such circumstances cover the entire area to be affected.

Should, on the other hand, the heat exchange pipes be disposed over the heat shunt area in hairpin fashion, wherein forward and return flow occurs on the same side, or in meandering fashion, wherein forward and return flows fan out from one feed point, a heat field, produced as the heat transport meduim changes temperature over its course, differs from that of the adjacent loop and dictates that the more highly conductive layer that acts as a heat shunt be discontinued by suitable means at the boundary separating it from the adjacent heat field. Otherwise, a heat bridge would be formed, which would create a short-circuit that would markedly diminish the heat removal ability of the system.

Should a thermal integral block be operated in dual purpose or multi-purpose mode so as to permit storage/loading or discharge, or, alternatively, the supply of surface heat or its removal (atmospheric collector), a compromise must be found with respect to the geometrical layout of the highly heat-conductive heat shunt layer and the optional operating conditions for a collector or storer. Depending on local conditions, several heat shunts can be installed in positions that lend themselves to various kinds of applications.

The heat shunt connects the heat flow occurring inside the thermal integral block with the heat exchanger.

In order to permit removal of the entire quantity of heat brought to the block, the heat conduction capacity $=Q_{ww}\cdot\lambda_{ww}$ should correspond at least to the heat flow to be captured in the integral block $Q_{th}M_{b1}\cdot\lambda_{th}M_{b1}$ if higher temperature deviations and attendant lower effectiveness are to be avoided. The layer cross-section, being thus defined, would then have merely to be connected to the heat exchanger, and could extend laterally away from such heat exchanger to the middle of the intermediate space separating the adjacent heat exchange pipe, to return to the point of origin. Such an embodiment of the heat shunt would, however, present technical difficulties and be generally too expensive. The primary practical application for such a heat shunt would be to serve in the capture of atmospheric/terrestrial energy by means of storage/collectors. The optimal quantity that could be captured by the collector would be determined by local climatic conditions. Such a quantity ranges between 30 and 150 W/m² and fluctuates, according to weather conditions, between very wide limits. An important factor in the generally dual purpose or multi-purpose operation is the capacity of the underground storage system to release energy. In a continuous operation, such capacity lies between $\lambda$ 4 W/mK, which is the maximum conductivity of very dense rock and $\lambda$ 0.3 W/mK, which represents the conductivity of dry earth, and is subject to only very minor variations.

Should excess energy be withdrawn from underground storage, i.e. there be excessive $\Delta K$ between the heat transporting medium and the underground, there exists during increased heat removal from the surface the danger of ice formation, which can be countered by a reduction in the heat loss per unit of area or by increasing the coverage (heat shunts located deeper, the existence of possibly a greater number of heat shunts to accommodate seasonal loss).

In the winter semester heat loss from the surface of unused areas such as parks, etc. with attendant icing, can be avoided by the use of an insulating cover, in some cases, such surfaces can be iced for recreational purposes.

Another important use for the proposed device consists in the storage and retrieval of energy in the form of heat, whereby in the event of an excess of heat, a thermal integral block can be very efficiently heated, and the warmth can be retrieved when required. The smallest temperature differences can serve the purpose of storage or retrieval and additionally the amount in storage, which can be increased through the inclusion of special storage bodies employing latent heat, is considerable, since such amounts can be utilized very effectively.

In the case of mobile thermal integral blocks e.g. such as those arranged on railway cars, a local thermal shift can be envisaged.

In general, the proposed device, i.e. the heat shunt permits the feed or removal of heat in low-conductive media, which was in conventional processes and systems possible only at considerable expense or given extremely favorable conditions.

The invention is described in greater detail by means of examples and general concepts revealed in the drawings.

Shown are:

Drawing 1. The schematically represented structure of a heat shunt with variations:
   a) heat transfer by means of heat exchanger using heat transport fluid
   b) electrical heat transport.

Drawing 2. The vertical section of a massive absorber—heat exchange according to:
   Drawing 2a: as a daily or annual storage system installed directly on a rock base.
   Drawing 2b: an artificial daily storer on top of an earth or sediment base serving as an annual storage system.

Drawing 3 Top view of pipe layout
   Drawing 3a: parallel-laid pipes, with flow in the same direction
   Drawing 3b: hairpin pipes.
   Drawing 3c: meandering pipes.

Drawing 4a-d Vertical sections through embodiment variations of the heat removal and heat exchange layers.

Drawing 5—Phase shift of the graph of the outside air temperature in the absorber circulation system.

Drawing 6—Phase shift of the temperature graph inside a massive absorber/storer.

The plusal views of FIG. 7 (FIG. 7a-7e) show schematic representation of the flow condtions in the heat removal system.

Drawing 8—Annual cycle of the atmospheric energy supply.

Drawing 9—Temperature curves as a function of depth below the earth's surface, in different seasons.

Schematically represented in drawing 1a is a device according to the invention, which essentially embraces heat conducting heat removal or feed layer 20, such device arranged inside and thermally connected to a thermal integral block 5. Layer 20 is thermally connected to tubular conduits 6a, in which a heat transport medium flows to/from a heat pump 3a (not shown) and to/from a heat source 4a or heat user 4a.

Analogously, drawing 1b shows layer 20, attached to which at the ends of an edge 6b has been a voltage line, e.g. connected through power source 4b.

The heat produced by the electricity running along the edge strip of layer 20 is conducted through this layer to the integral block. Similarly, heat may, through the use of a Pelletier-Element (not shown), be drawn from the integral block by means of an electric current.

Drawing 2 depicts in vertical section the basic structure of a massive absorber/storer in alternative a, on top of a rock that acts as a rock storage system 15 ($\lambda = 1.75-4.65$ W/mK) or b, on top of earth or sediment 16 ($\lambda < 0.8$ W/mK).

The bare rock is covered with a flat layer 17 of dense cement ($\lambda > 1.16-1.4$ W/mK) in order to form a suitable pipe-laying surface 20.

Earth or sediment is consolidated by stamping in loose rocks and by being covered with lean concrete 18 ($\lambda \sim 0.8$ W/mK) and developed into an optional second pipe-bearing surface 20. The daily storer 19 having a thermal conductivity $\lambda = 1.16 - 1.4$ Wm/K is embodied as a massive reinforced concrete plate of highly compressed concrete whose thickness corresponds to the daily storage requirement but is any case at least 15 cm. The heat removal and heat exchange layer having a heat conductivity at least 100 times that of the massive absorber/storage block is formed by heat transport fluid conduits 6 and the heat conducting layer 22 that covers as fully as possible the removal plane and is connected to the former in such a way as to facilitate heat conduction, both of which being constructed preferably of copper having a thermal conductivity of $\lambda \sim 400$ W/mK.

Thus, a structure is created that can be considered a heat shunt. Warmth from the outside enters through the material of storer 19 into the heat conducting material layer, whose thermal conductivity $\lambda$ is 200–400 W/mK. The layer, e.g. in the form of connected plates 22, is very thin, e.g. 0.1-1 mm, and permits the transfer of the arriving heat batches into small cross sections that are designed to take into account the values $\lambda$ for the storer and $\lambda$ for the metal, which is preferably Cu, in any direction. Such heat is transferred to the heat absorbing water by means of forced convection. Thus there is provided an elegant means of shunting heat in any direction.

The heat conducting layer should be joined to the underlying layer as well as to the overlying concrete layer so as to preclude pore formation and to conduct heat. The removal of heat and the transfer of the latter from the transport medium can take place either in a single plane suitable for conducting atmospheric or terrestrial heat in accordance with Drawing 2a or in two phases in accordance with Drawing 2b which, separately, serve to capture absorbed or stored heat.

The absorbing top layer 21 on the surface whose conductivity is $\lambda \sim 1.2$ W/mK should, together with the underlying layers that serve as a bed, be constructed given respect to the primary function, e.g. that of road surface, etc. The thickness of layer 21 should be such that surface temperature differences, i.e. the temperature differences occurring on the surface, are not detected in the pipes or the thermal shunt (e.g. <2K). The absorbing area can itself be constructed so as to better absorb solar radiation if tar, paint, dark additives or possibly a layer 24 of asphalt or dark natural rock, is applied.

The massive storage block should be insulated against heat loss to the outside or against drawing heat from adjacent buildings by means of a heat stop 23 ($\lambda < 0.6$ W/mK) composed of expanded clay aggregate or other weather-resistant material and sunk to a suitable depth, so as to permit the heat to flow essentially only at right angles to the absorbing top surface.

If, due to low outside temperatures, heat is drawn from the storer through the absorbing surface, such an undesirable heat flow can be reduced by the employment of an insulating cover 25 ($\lambda < 0.1$ W/mK) that can be controlled by temperature or radiation-sensitive devices and be capable of being rolled away.

Drawings 3a, b and c give the outlines of three different embodiments of a quasi two-dimensional removal layer inside a heat exchanger that constitutes a massive absorber/storer 5. The pipe diameter depends upon the hourly flow requirement, whereby the cross-sections should, in order to avoid pump energy losses and flow rates >1 m/s, be of adequate size.

In order to ensure the optimal use of latent and convectional heat in condensate and atmospheric precipitations congregating at top layer 21, or its optional covering 24, the surface should be as water-repellant as possible and sufficiently sloped.

Drawing 3a shows a heat exchanger having parallel, unidirectional flow, i.e. prefeed at 26 on one side and return/delivery/27 on the other.

Even flow through the register is ensured by directing the flow forward or backward according to Tichelmann or by the use of bilateral connected blocks of large cross-section that serve to equalize pressure. In the removal plane, the temperature rises steadily up to the exit side. Heat removal sheets 22 can hence completely cover the entire area.

Drawing 3b shows a hairpin register in which the individual flow paths of the fluid have different lengths. To ensure the flow of equal quantities of heat, the flow rates in the individual flow paths are proportional to the respective thermoboundary plane which means that the diameter of each individual flow path is corresponding to the plane surface area of the respective thermoboundary to ensure the flow of equal quantities of heat. However, fields of differing temperature occur in the forward flow and return flow legs. Heat conducting layer 22. Heat conducting layer 22 must, in consequence, be separated at 28 medially between the pipes by a space of 5–10 mm. The width of the plate field can be changed by alternating the arrangement of hairpin pairs.

The meandering arrangement according to Drawing 3c facilitates the coverage of complex areas. The fields of differing temperature, however, increase in complexity, and the disposition of the uncircumventable zones 28 separating the plates for the purpose of discouraging the mutual influence of the individual heat fields, becomes less predictable.

In the case of the quasi three dimensional removal of heat from the spatially practically unbounded rock storer 15, such temperature fields are, compared to the withdrawal of heat from the atmosphere, of subsidiary importance.

Drawings 4a–d show in section embodiments of the heat exchanger. The most cost-effective and adaptable systems are basically those using commercially available copper pipes and sheets, examples of which are shown in drawings 4a and b.

The space between the pipes, or rather, the effective width of the heat absorbing plates 22 that direct flow to the heat exchanging pipes 6a, i.e.

effective width × $\frac{1.16}{400}$ (Conductivity = 1.16 of the cover plate 21/plates 22 — conductivity $\lambda$ = 400) i.e.

| | | |
|---|---|---|
| for the extreme pipe separating spaces | 1000 mm or | 200 mm |
| or pipe axis half distances | 500 mm | 100 mm |
| minus effective pipe zone | 40 mm | 30 mm |
| = effective plate area | 460 mm | 70 mm |
| the plate thickness becomes approx | >1.2 mm | >0.2 mm. |

The heat conduction-connection to fluid conduits embodied as pipes 6 can be ensured through adequate coverage with longitudinally or cross-crimped sheeting embodied as "continuous" heat-conducting layers 22 0.15 to 0.4 mm thick. Flat sheets can also be attached, by means of welding or soldering to pipes 6a as prefabricated sections. The space separating the pipes and thickness of the plates should be optimized for varying applications in accordance with local material and construction costs, whereby small pipe-separating spaces are especially suitable for parallel, unidirectional pipe registers.

Drawing 4c shows a rectangular box 29, stiffened on the inside by struts or spacers and that produces an ideal flow pattern, the rigidity of such rectangular box 29 first being ensured when the concrete sets.

In drawing 4d, dual layered, welded sheets, or socalled rollbond-elements which are not welded together, are widened to form through flow cross-sections 30 of adequate dimensions. In such heat exchangers, conduction pipes 6a are combined with sheets 22 and are primarily suited for fluid-conveying unidirectional parallel registers according to drawing 3a.

The heat flowing to the absorbing surface is dependent upon solar radiation and, with regard to global radiation and latent heat as well as conventional heat, upon the temperature of the surface. The quantities of such heat forms are determined largely by local climatic conditions and by the supercooling capacity of the collector.

Although daily highs and mid-week values for solar and global radiation throughout the course of a year are known to have held true for a great number of geographical localities, such as e.g. appear in the handbook "Climatic Data for Energy Engineering—July 1981 to June 1985", of the SMA, these give only an approximation of the practical energy capture capacity of a system.

Hence, in a climatically ideal location, (regular maturing of corn to the cob state) an energy capture based on the data given of 100 W/m$^{-2}$ should be appropriate.

The supply of latent heat of convectively transported atmospheric precipitations and heat being subject to dew conditions, fluctuating frequently over time and the quantity of which varying within broad limits renders impossible the estimation of the total atmospheric energy supply.

The daily cycle of the external heat supply is shifted, timewise, due to the inherent inertia of the absorber system according to Drawing 5 and in far greater measure to the speed at which the massive storer according to Drawing 6, is loaded.

The optimal 10–12 hour shift of the maximum extraction rate to the external air minimum is possible in the case of limited heat withdrawal given a rock storer 15, and is ensured by the use of an artificial daily storer 19 having sufficient storage capacity.

The dual purpose or multi-purpose function of the system is revealed in the five operating modes shown in Drawings 7a–e. In Drawing 7a, no heat is withdrawn. System 1 is not operational. The total absorbed atmospheric energy flows into rock storer 15 in Drawing 2a or into daily storer 19 and to a lesser extent into the earth or sediment 18 (Drawing 2b). Should the extraction system be operating, then either (as in Drawing 7b) only part of the absorbed energy or (as in Drawing 7c) the entire quantity of energy can be withdrawn, whereby in case b) the excess flows into the storer.

Figure 7D:
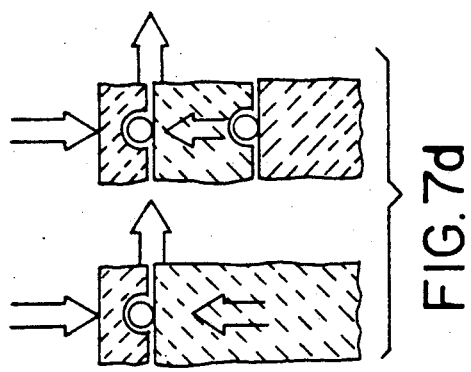
Figure 7C:
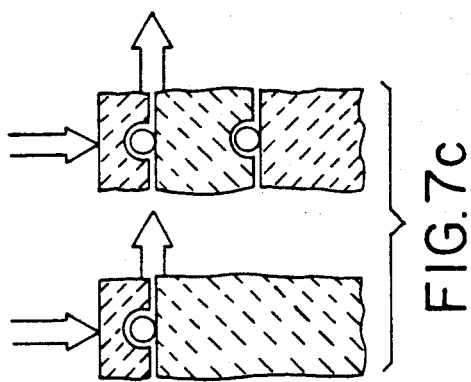
Figure 7E:
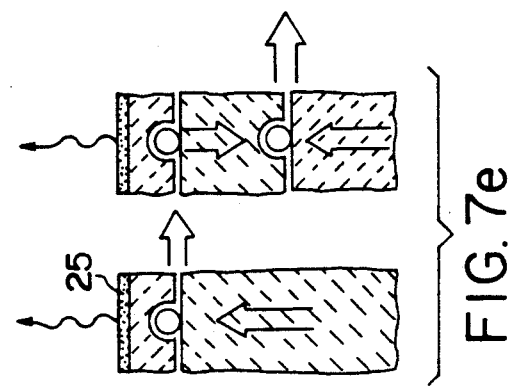
Figure 7B:
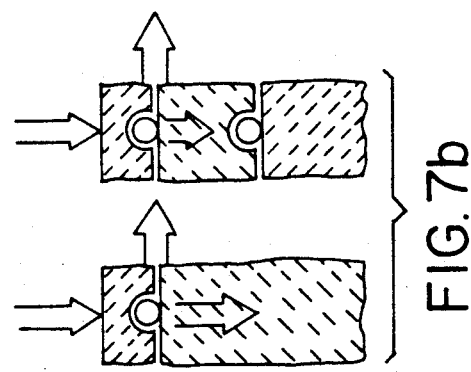
Figure 7A:
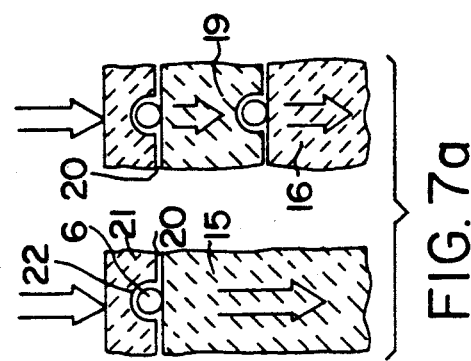
Figure 8:
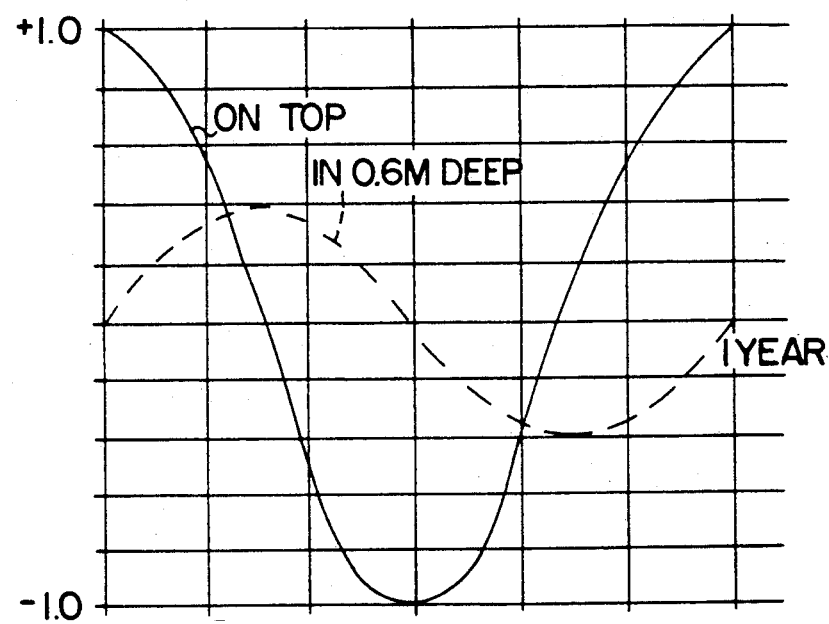
Figure 9:
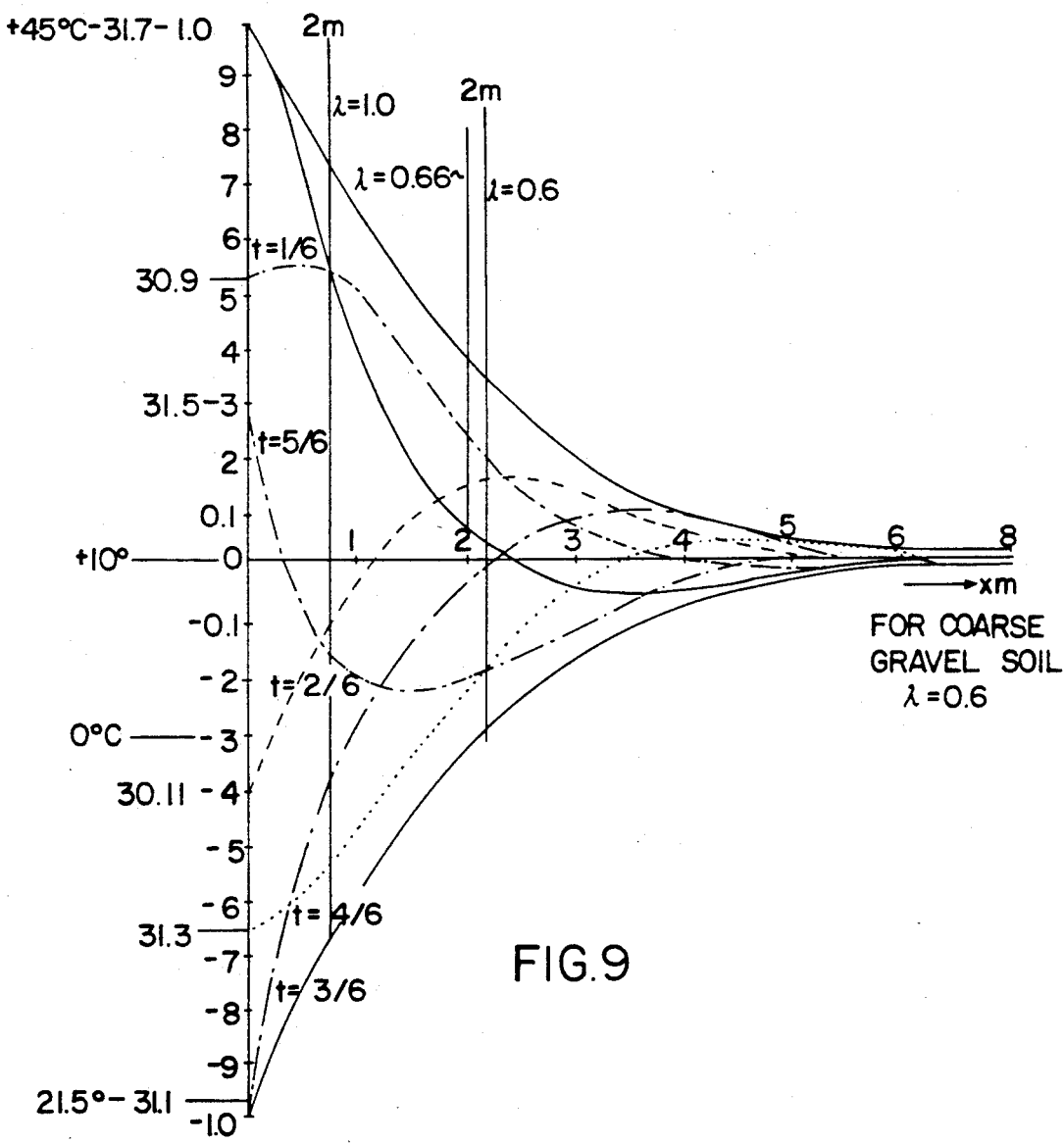

Complete extraction with insufficient absorption and partial voiding of the storer is represented by FIG. 7d. If, as a consequence of seasonal change, as in Drawing 8, the atmospheric energy becomes unuseably small, then only the terrestrial heat according to Drawing 7e can be utilize. Heat loss through the absorbing surface should be minimized through an insulating layer 25. If further withdrawal layers are present underneath the daily storer according to Drawing 2b, the heat can be withdrawn.

A precondition to the amount of terrestrial heat that can be retrieved per unit area from rock storer 15 or from sediment 16 is that of the homogeneity and isotropism of the storage mass. Such conditions are present only under certain circumstances; as a rule, rock is integumentary, anisotropic, may contain water-bearing veins, is of uneven depth, may contain soil and sediment and, unless the soil undergoes expensive testing for thermophysical characteristics, hardly admits of assessment. Only the heat exchanger employed to extract atmospheric energy can be utilized to the greatest extent possible. The extraction rate of 100 Wm$^{-2}$ chosen as the ideal rate should be adequate in the case of hard rock having greater thermal conductivity and high heat content.

Massive absorber/heat exchanger 5 can be embodied as canal beds or load bearing surfaces for the purpose of extracting heat from flowing water, preferably hot waste water. The prefabrication of high-load bearing, e.g. prestressed concrete elements, permits the installation of special heat exchange-extraction layers that incorporate poorly deformable conduit systems 6a whose deformability increases during setting of the surrounding concrete. In such prefabricated elements, the heat exchangers are, together with forward and return flow (connection distribution) boxes, especially well protected and the heat conducting connection with the concrete is assured.

If sufficient open areas without intensive plant growth are available, the installation of an extraction layer of limited output (30–80 W/m$^2$) in soil of low conductivity ($\lambda = 0.3$–$0.7$) can be economical.

The bare extraction layer is laid at a depth of 20–50 cm and is covered with standard copper sheets suitable for vertical construction (2×1 m, 0.55 mm thick) that are crimped in the center in the longitudinal direction so as to be able to clip onto the pipe register. Such sheets serve as a heat shunt. The extraction layer is next covered over with fill and then with topsoil, and planted.

From these considerations, one can derive the following quantitative principles to govern the construction of the described system:

1. The temperature curves and thus the temperature fluctuations occurring at a depth X which is the distance measured from the open absorbing surface, are given by the envelopes according to Drawing 9.
2. In order for the daily periodicity (Daily cycle) of the energy absorbed by the open absorber surface to be utilized, the fluid conduction system, such as are represented in Drawings 5 and 6, must be set out at depths that are measured in decimeters.

When installing such a system the desired phase shift (Drawing 5) must be taken into account, that is dependent upon the frequency of the excitation temperature oscillation as well as the temperature conductivity coefficient of the absorber/storage material. If n is the oscillation coefficient, t time, x depth and a the temperature conductivity coefficient, such a phase shift can be expressed by the relationship $$\cos\left(n \cdot t - \frac{\sqrt{n}}{a \cdot \sqrt{2}} \cdot x\right)$$

The phase shift increases as depth x increases oscillation coefficient n and as the thermal conductivity coefficient $\lambda$ of the absorber storage material decreases.

The heat energy to be extracted becomes, given a selected installation depth x, a question of the size of the open absorbing surface and of that of the fluid transport system, its construction and constitution.

A further secondary condition that should be taken into account is that of the selection of the installation depth x, when the temperature boundaries at such depth x are known. The envelopes of the daily temperature curves—which are analogous to the yearly temperature curves in Drawing 9 define the installation zone, in which such limits are to be anticipated. On the ordinate indicating the temperature in °C., are given for the data 31.1, 30.4, 31.7 and 31.10 temperature curves dependent upon the distance from the surface of the earth.

3. The optimal exploitation of the anual cycle of the energy absorbed by the open absorbing surface is subject to analogous principles relating to the choice of installation depth, as formulated in point 2. It is obvious that, given such conditions, the factor of storage capacity should be accorded far greater importance. In this case, however, the choice of installation depth x is, as opposed to point 2, subject to construction-related expense and, if need be, an increased amount of displaced soil.
4. Such considerations would indicate that from a purely technical viewpoint, it would be desirable to install at least a number of fluid transport systems at various depths to correspond to the periodicity number relating to the absorption of heat from the open atmosphere.

There would be two such numbers—one for the daily cycle and another for the yearly cycle. Whether it will serve any purpose in the future to add to such cycles, remains to be seen. The factors that effectively influence the entire problem and contribute to the choice of solution are technical or constant, but are purely economic ones, such as material costs, wages, construction specifications, environment, etc. Since these factors are subject to constant change, optimalisation will always necessitate further embodiments.

All of the individual components and individual distinguishing features described in the disclosure and/or drawings, as well as permutations, combinations and variations thereof, are inventive. The same holds true for n components and individual distinguishing features having the values n=1 to n→∞.

I claim:
1. A device suitable for storage and absorption or dispensing of heat comprising:
   a body of low thermal conductivity of less than 20 W/mK suitable for storage and absorption of heat;
   means for conveying heat to and from a heat transporting medium to the body, wherein the conveying means includes a plurality of tubes for the flow of heat therethrough;
   at least one heat transporting layer thermally connected to the body for supplying heat to and for withdrawing heat from the body in one or more essentially parallel planes, the at least one heat transporting layer having a surface that is in direct thermal contact with the conveying means for transferring the heat to and from the heat transporting medium, wherein the at least one heat transporting layer mates with each tube so that less than half of the surface area of each tube is in contact with the at least one heat transporting layer, wherein the at least one heat transporting layer consists of a material having a thermal conductivity coefficient greater than that of the body, and wherein the layer is positioned transverse to the direction in which heat flows from the heat transporting medium to the body.

2. The device according to claim 1, wherein the at least one heat transporting layer has a thermal conductivity which is at least 50 times that of the body.

3. The device according to claim 1, wherein the device is connected to a heat exchanger which conducts the heat transporting medium, and wherein the device further comprises a pipe conduit circulation system for transporting the heat, the pipe conduit circulation system comprising a circulating pump connected to an energy consumer or generator which is either connected to a heat transporting medium conduit or is formed directly by the heat exchanger connected to the body of low thermal conductivity.

4. The device according to claim 3, wherein the cross section Cww of the at least one heat transporting layer produces the connection between the heat flow in the body and the heat exchanger, and corresponds to a higher conductivity λ ww according to the equation $$C_{ww} = Q^{th\,Mbl} \frac{\lambda^{th\,Mbl}}{\lambda_{ww}}$$

where Qth Mbl is the cross section of the heat flow in the body having the lower conductivity of λth Mbl.

5. The device according to claim 1, wherein the at least one heat transporting layer is connected in such a way as to conduct heat with the body with low thermal conductivity, and is made of highly conductive material selected from the group consisting of copper, aluminum, silver, gold and/or an alloy of these metals, an aluminide, a silicide, a modification of carbon and/or a plastic, wherein the group has a higher heat conductivity than the body.

6. The device according to claim 4, wherein the at least one heat transporting layer is made of cast-in metals with high thermal conductivity, wherein the cast-in metals is selected from the group consisting of copper, aluminum, silver, gold and their alloys.

7. The device according to claim 4, wherein the at least one heat transporting layer is formed by the addition, in layer form, of powdered or granulated materials selected from the group consisting of copper, aluminum, silver, gold, modified plastics, aluminides and/or silicides, and by subsequent after-treatment, wherein the after-treatment is sintering or reactive cross-linking.

8. The device according to claim 7, wherein the body can absorb or store heat and is used to exchange heat at its thermal boundary surfaces, and wherein the body has in its interior, almost parallel to said thermal boundary surfaces, highly conductive layers connected with second heat exchangers in such a way as to conduct heat.

9. A device according to claim 1, wherein the body of low thermal conductivity is used for heat exchange at the thermal boundary surfaces, and for heat storage for the purpose of capturing the heat flow alternatively for collection or storage operation, wherein the body has several layers with higher heat conductivity which lie one behind the other in the direction of the heat flow.

10. The device according to claim 9, further comprising pipes which carry the heat transporting medium laid out in the at least one heat transporting layer in a pattern of a register at intervals of 5 to 120 cm.

11. The device according to claim 1, for obtaining atmospheric or terrestrial heat, wherein the at least one heat transporting layer further comprises a massive absorber with storage capability which is located in the open air and includes a heat removal and exchange system constructed on soil to draw heat from the massive absorber with storage capability in one or more layers lying transversely to the natural flow of heat and to transfer it to the heat transporting medium, wherein the heat removal and exchange system consists of a material having a thermal heat conductivity λ >200 W/mK and is connected to conduct heat with a concrete structure which envelopes the layer, and wherein the device further comprises a removal layer that is self-enclosed within the individual temperature fields formed according to the type of heat removal effected through the heat transporting medium, but is separated from other removal areas in the same removal layer.

12. The device according to claim 11, wherein the at least one heat transporting layer further comprises a heat removal portion and a thermal energy storage device having soil and a liquid-carrying conduit system installed in concrete and/or in soil which system is connected with the concrete and/or soil to permit the exchange of heat, wherein the conduit system consists of a material whose thermal conductivity coefficient is λ >200 W/mK and the conduit system is connected to conduct heat with at least one removal layer which is self-enclosed or network-like, with the at least one removal layer having a thermal coefficient which is at least 80 or 100 times greater than that of the concrete or soil material surrounding the at least one removal layer.

13. The device according to claim 11, wherein massive absorber corresponds to the fluctuations in the heat supply and demand during the day so as to permit a natural charging of the storage device by the higher heat supply during daytime and a postponed heat removal, corresponding to the demand at the lower nighttime temperatures and/or to the lower rates for electric power.

14. The device according to claim 11, wherein the massive absorber is a transportation surface and is constructed as a thermal massive absorber for storage purposes which, in addition to the load-bearing capacity suitable for the transportation surfaces, also has the capturing capacity and thermal conductivity to function as an optimal atmospheric heat collector/storage device and to permit removal or return of the stored heat to compensate for the fluctuations of the heat supply during the day and the demand for heat for home heating or the preheating of water for general use.

15. The device according to claim 14, wherein the massive absorber has an absorbing surface that is exposed to the open atmosphere and is designed as a radiation absorber, with a heat conductivity of λ >0.8 W/mK and with a thickness of 2-20 cm, good water wettability and an inclination of 1°-5°.

16. The device according to claim 12, further comprising a covering layer above the heat removal layer which is connected to conduct heat with an underlying rock by means of a concrete filling with a thermal conductivity of $\lambda > 1$ W/mK.

17. The device according to claim 12, wherein the device is an artificial daytime storage device, preferably of concrete or massive masonry ($\lambda$ 1.0–1.4 W/mK) with a thickness of at least 15 cm, is constructed on a foundation of soil or sediments with a thermal conductivity of $\lambda < 0.8$ W/mK, in order to satisfy a thermal capacity which corresponds to the storage requirements.

18. The device according to claim 1, wherein the device is a heat shunt for obtaining atmospheric and terrestrial heat, wherein the heat shunt is a solid body with a thermal conductivity coefficient of 0.5–5.0 W/mK, having an end surface which is essentially flat, and a layer of material which has a thermal conductivity coefficient of 200 to 400 W/mK and is connected with the end surface of the body to conduct heat in order to draw off the amount of heat flowing from the body into the end surface through the layer of material and to do this essentially parallel to the end surface.

19. The device according to claim 1, wherein the device is used to regulate the thermal balance or the heat input and/or output in nonmetallic vessels for industrial, chemical, biochemical, biological processes and containments with low thermal conductivity and further comprises at least one high thermal conductivity layer functioning as a heat shunt to form a heat bridge to a heat exchanger.

20. The device according to claim 1, wherein the device is used to regulate thermal balance.

21. The device according to claim 1, wherein the device is used to regulate temperature, and wherein the at least one heat transporting layer is made of copper, silver or gold and functions as a heat shunt to form a heat bridge to a Joule resistor element or a Pelletier element.

22. A device suitable for storage and absorption or dispensing of heat comprising:
a body of low thermal conductivity of less than 20 W/mK suitable for storage and absorption of heat;
means for conveying heat from a heat transporting medium to the body, wherein the conveying means includes a plurality of tubes for the flow of heat therethrough in each heat transporting layer and heat flows in the opposite direction in each adjacent pair of tubes, and wherein each tube of each adjacent pair of tubes is separated from the other tube by a space that acts to interrupt a heat shunt therebetween;
at least one heat transporting layer thermally connected to the body for supplying heat to and for withdrawing heat from the body in one or more essentially parallel planes, the at least one heat transporting layer having a surface that is in direct thermal contact with the conveying means for transferring the heat to and from the heat transporting medium,
wherein the at least one heat transporting layer consists of a material having a thermal conductivity coefficient greater than that of the body, and wherein the layer is positioned transverse to the direction in which heat flows from the heat transporting medium to the body.

23. The device of claim 22, wherein the at least one heat transporting layer covers entirely each of said plurality of tubes.

24. The device of claim 1, wherein the plurality of tubes are parallel to each other, and wherein heat flows in the opposite direction in each adjacent pair of tubes, and wherein each tube of each adjacent pair of tubes is separated from the other tube by a space that acts to interrupt a heat shunt therebetween.

25. The device of claim 23, wherein the at least one heat transporting layer covers entirely each of said plurality of tubes.

26. A device suitable for storage and absorption or dispensing of heat comprising:
a body of low thermal conductivity of less than 20 W/mK suitable for storage and absorption of heat;
means for conveying heat from a heat transporting medium to the body, wherein the conveying means includes a plurality of tubes for the flow of heat therethrough;
at least one heat transporting layer thermally connected to the body for supplying heat to and for withdrawing heat from the body in one or more essentially parallel planes, the at least one heat transporting layer having a surface that is in direct thermal contact with the conveying means for transferring the heat to and from the heat transporting medium, wherein the at least one heat transporting layer mates with each tube so that less than half of the surface area of each tube is in contact with the at least one heat transporting layer, and wherein the at least one heat transporting layer consists of a material having a thermal conductivity coefficient greater than that of the body, and
wherein the layer is positioned transverse to the direction in which heat flows from the heat transporting medium to the body, and wherein the layer forms a plurality of isotherms which are formed depending on the type of heat inflow or outflow produced by the at least one heat transporting layer, and
wherein the at least one heat transporting layer includes a plurality of zones for separating the plurality of isotherms, the plurality of zones act to prevent each isotherm from effecting a heat field of the other isotherms.

* * * * *